United States Patent Office 3,832,365
Patented Aug. 27, 1974

3,832,365
QUINONE INTERMEDIATES FOR SYNTHESIS
OF 6-HYDROXYDOPAMINE
Pius Anton Wehrli, North Caldwell, N.J., assignor to
Hoffmann-La Roche Inc., Nutley, N.J.
No Drawing. Filed Mar. 14, 1972, Ser. No. 234,658
Int. Cl. C07c 103/12, 103/22, 125/06
U.S. Cl. 260—396 R          4 Claims

ABSTRACT OF THE DISCLOSURE

Preparation of 6-hydroxydopamine, a known antihypertensive and blood pressure lowering agent, from an hydroxy-alkoxy-phenethylamine including intermediates in this process.

SUMMARY OF THE INVENTION

In accordance with this invention, it has been found that 6-hydroxydopamine, a known antihypertensive and blood pressure lowering agent, which has the formula:

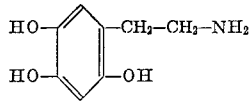

I can be prepared from a compound of the formula:

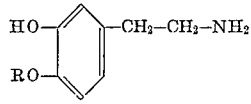

II wherein R is lower alkyl via intermediates of the formula:

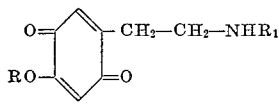

III wherein R is as above and $R_1$ is hydrogen or a conventional amino protecting group removable by hydrogenolyses or hydrolysis and

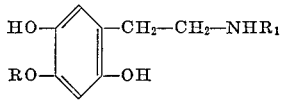

IV wherein R and $R_1$ are as above.

In accordance with this invention, it has been found that the compound of formula III and IV are useful as antiparkinson agents.

DETAILED DESCRIPTION

The term "halogen" includes all four halogens, i.e., chlorine, bromine, fluorine and iodine, with chlorine and fluorine being preferred.

The term "lower alkyl" comprehends both straight and branched chain saturated hydrocarbon moieties having from 1 to 6 carbon atoms, such as methyl, ethyl, propyl, i-propyl, t-butyl, and the like with methyl being preferred. The term "lower alkoxy" comprehends moieties which can be designated -O(lower alkyl), wherein lower alkyl is defined as above. Among the preferred lower alkoxy moieties are included methoxy, ethoxy and propoxy.

The term "aryl" as used throughout the application includes mono-nuclear aryl groups such as phenyl which can be unsubstituted or substituted in one or more positions with hydroxy, methylenedioxy, halogen, nitro, lower alkyl, lower alkoxy substituents and polynuclear aryl groups such as naphthyl, anthryl, phenanthryl, azulyl, etc., which may be substituted with one or more of the aforementioned groups.

The term "aryl-lower alkoxycarbonyl" comprehends aryl-lower alkoxycarbonyl groups wherein the aryl and lower alkoxy moieties are defined as above. The preferred aryl-lower alkoxycarbonyl groups are phenyl-lower alkoxycarbonyl with benzyloxycarbonyl being especially preferred.

The term "lower alkanoyl" includes alkanoyl radicals containing from 2 to 6 carbon atoms such as acetyl, propionyl, butyryl, etc. The term "aryl-lower alkanoyl" includes aryl lower alkanoyl radicals wherein "aryl" and lower alkanoyl are defined as above.

The compounds of formulae III and IV and their acid addition salts are useful as anti-parkinson agents. The compounds of formulae III and IV as well as their salts, are used in the form of conventional pharmaceutical preparations which contain said compounds in connection with conventional pharmaceutical organic or inorganic materials suitable for internal administration. The pharmaceutical compositions containing the compounds of formulae III and IV as well as their salts can be administered parenterally or orally. Dosages can be adjusted to individual requirements, for example, these compounds can be administered in dosages of from about 50 mg./kg. to about 100 mg./kg. p.o. per day. These dosages can be administered in a single dosage form or in divided dosage forms. The pharmaceutical compositions can contain conventional organic or inorganic inert carrier materials such as water, gelatin, lactose, starch, magnesium stearate, talc, vegetable oils, gums, polyalkylene glycols, Vaseline and the like. The pharmaceutical preparations can be in conventional solid dosage forms such as tablets, dragées, suppositories, capsules, or in conventional liquid dosage forms such as solutions, suspensions or emulsions. The pharmaceutical compositions can be submitted to conventional pharmaceutical expedients such as sterilization and/ or can contain conventional pharmaceutical additives such as preservatives, stabilizing agents, wetting agents, emulsifying agents, salts for adjusting the osmotic pressure, buffers or the like. They can also contain other therapeutically useful materials. Compositions can be formulated which contain from 1 percent to 99 percent of the active ingredient of formulae III and IV and from 1 percent to 99 percent by weight of inert carrier materials.

In accordance with this invention, the compounds of formulae III and IV, with their pharmaceutically acceptable salts exhibit the aforementioned beneficial therapeutic properties. The compounds of formulae III and IV where $R_1$ is hydrogen, form a pharmaceutically acceptable salt, with both inorganic and organic pharmaceutically acceptable acids. Among the acids which the compounds of formulae III and IV form pharmaceutically acceptable acid addition salts are included hydrochloric acid, hydrobromic acid, sulfuric acid, phosphoric acid, citric acid, acetic acid, succinic acid, maleic acid, methanesulfonic acid, p-toluenesulfonic acid and the like. Such acid addition salts are also within the scope of the invention.

That the compounds of formulae III and IV are effective anti-parkinson agents can be seen by the fact that compounds such as N[2-(4-methoxy-3,6-dioxo-1,4-cyclohexadien-1-yl)ethyl]carbamic acid benzyl ester; N[2-(4-methoxy-3,6-dioxo-1,4-cyclohexadien - 1 - yl)ethyl]formamide; and N-(2,5-dihydroxy-4-methoxyphenethyl)acetamide have $ED_{50}$'s of less than 100 mg./kg. i.p. when administered to mice having catatonia induced by reserpine in accordance with the procedure described by Chesare et al. in the Archives Internationals Pharmacodynamie et de Therapic 169, 26 (1967). On the other hand, the $ED_{50}$ of L-dopa when administered by the same method was 430 mg./kg. i.p.

In the compounds of formulae III and IV, $R_1$ can be any conventional amino protecting group which can be easily removed by either hydrogenolysis or hydrolysis. Among the preferred amino protecting groups which can be utilized in accordance with this invention are formyl, aralkoxycarbonyl groups such as benzyloxycarbonyl, t-butyloxycarbonyl; lower alkanoyl groups such as acetyl, and aroyl groups such as benzoyl.

The compound of formula II containing the amino protecting group i.e., the compound of the formula:

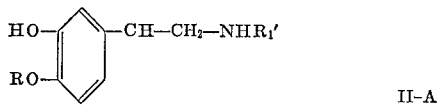

II-A where $R_1'$ is a conventional amino protecting group which can be removed by hydrogenolysis or hydrolysis and R is as above, is formed by reacting, in a conventional manner, the compound of formula II with an activated derivative of the protecting group such as an activated acid derivative.

Among the activated acid derivatives are included acid halides and acid azides. These acid halides include aralkoxy carbonyl halides such as benzyloxy carbonyl chloride, lower alkanoyl halides such as acetyl chloride, and aroyl halides such as benzoyl chloride. Among the acid azides which can be utilized are included t-butyloxycarbonyl azides. Any of the conventional methods of reacting an amine with an activated acid derivative to form a protected amine can be utilized in forming the compound of formula II-A.

Where $R_1'$ in the compound of formula II-A is a formyl group, this compound is prepared by reacting compounds of the formula II with a formylating agent. Any conventional formylating agent can be utilized to prepare the compound of formula II-A where $R_1'$ is formyl. Among the preferred formylating agents are formic acid and the lower alkyl formates such as methyl formate. Any of the conditions conventional in reacting an amine with a formylating agent such as methyl formate can be utilized in preparing the compound of formula II-A where $R_1'$ is formyl.

In the next step of the procedure, the compound of formula II-A is oxidized to a quinone of the formula:

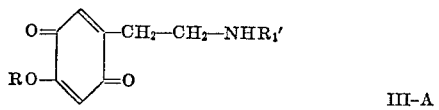

III-A wherein R and $R_1'$ are as above.

In oxidizing the compound of formula II-A to the compound of formula III-A, any conventional method of converting phenols to quinones can be utilized in accordance with this invention. Among the methods of oxidation are included treating the compound of formula II-A with an oxidizing agent such as potassium permanganate or lead dioxide or an organic peracid such as perphthalic acid. Any of the conditions conventional in oxidizing with a perorganic acid or with an oxidizing agent such as potassium permanganate and lead dioxide can be utilized.

In accordance with a preferred embodiment of this invention, the compound of formula II-A is converted to the compound of formula III-A by utilizing a nitrosodisulfonate of the formula:

V wherein X is an ammonium ion, an alkali metal or an alkaline earth metal and $m$ is 1 or 2 with the proviso that when X is an ammonium ion or a monovalent metal, $m$ is 2 and when X is a divalent metal, $m$ is 1.

In the compound of formula V, X can be any conventional alkali metal or alkaline earth metal. Among the conventional alkali metals are included sodium, potassium, lithium, rubidium, etc. Among the conventional alkaline earth metals which are designated by X are included magnesium, calcium, etc.

In accordance with the preferred embodiment of this invention, oxidation of the compound of formula II-A the nitrosodisulfonate of formula V produces the compound of formula III-A in quantitative yields, i.e., above 90%. This reaction can be carried out in an inert solvent medium. If desired, water can be utilized as the inert solvent medium. On the other hand, any conventional inert organic solvent can be utilized as the inert solvent medium. In carrying out this reaction, temperature and pressure are not critical and this reaction can be carried out at room temperature and atmospheric pressure. On the other hand, if desired, elevated or reduced temperatures can be utilized in carrying out this reaction.

In accordance with another embodiment of this invention, the compound of formula II-A is oxidized to the compound of formula III-A by electrolysis in the presence of a hydroxylamine of the formula:

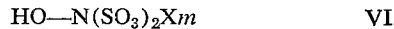

VI wherein X and $m$ are as above.

This electrolysis produces the compound of formula III-A from the compound of formula II-A in approximately quantitative yields, i.e., above 90%.

This oxidation process can be carried out in a conventional electrolytic cell. In accordance with the present invention, a liquid aqueous reaction mixture containing the phenol of formula II-A above and the hydroxylamine of formula VI above is placed in an electrolytic cell, e.g., an electrolysis tank which may or may not be provided with a cell divider or membrane which is provided with an anode or cathode. The cathode and the anode can be made of any material commonly employed for making cathodes and anodes in the electrochemical art, e.g., carbon, Monel, stainless steel, platinum, palladium, nickel, nickel alloy, etc. The electrolytic cell can be provided with a stirrer or mechanical agitator, or the reaction medium can be circulated by means of pumps. Electrolysis can be carried out by applying voltages of from 0.5 to 50 volts to the liquid aqueous reaction medium. Generally, it is preferred to carry out the reaction utilizing from 5 to 25 volts. The electric current passed through the solution can be of a current density of up to 50 amperes per square decimeter and can be as low as 0.01 ampere per square decimeter. Generally, it is preferred to utilize the current density of from 0.02 to 25 amperes per square decimeter.

In carrying out the electrolysis reaction more efficaciously, any conventional electrolyte can, if desired, be added to the aqueous medium. Among the conventional electrolytes, which can be added to the liquid aqueous reaction medium prior to electrolysis are included sodium hydroxide, sodium bicarbonate, acetic acid, sodium carbonate, sodium acetate, sodium phosphate, sodium chloride, ammonium hydroxide, etc. Generally, it is preferred to add the electrolyte to the liquid aqueous medium in an amount of from 0.1% to 10% by weight of the liquid medium. During the electrolysis reaction, the pH of the reaction medium is maintained at 4 or above. Optimally, this reaction is carried out at a pH of from 4 to 13. The aforementioned electrolytes can be utilized to maintain the desired pH.

The liquid aqueous medium that is subjected to electrolysis in accordance with this invention contains an inert liquid organic solvent in which the phenol of formula II-A is dissolved. Any conventional inert organic solvent can be utilized in accordance with this invention. Among the conventional inert organic solvents are included xylene, toluene, hexane, heptane, benzene, ethyl acetate, halogenated aliphatic hydrocarbons such as chlorobenzene, methylene chloride, carbon tetrachloride, ethers such as tetrahydrofuran, diethyl ether, etc. Generally, from about 1 mole of the hydroxylamine of formula VI above is present per mole of the phenol of formula II–A above. In accordance with this invention, conversion of the phenol of formula II–A in yields of approximately 100% can be carried out by utilizing only 1 mole of the hydroxylamine of formula VI per mole of the phenol of formula II–A. However, if lower yields are desired, approximately 0.5 moles of the hydroxylamine of formula VI per mole of the phenol of formula II–A can be utilized. On the other hand, large excesses of this hydroxylamine can, if desired, be utilized. No additional beneficial results are achieved by utilizing large excesses of hydroxylamine. However, if desired, the hydroxylamine of formula VI can be present in an amount of about 10 moles per mole of the phenol of formula II–A or greater. The electrolysis reaction can be carried out at any temperature of from $-15°$ C. to $50°$ C. Generally, it is preferred to carry out this reaction at a temperature of $-10°$ C. to $+10°$ C.

The reaction medium that is subjected to electrolysis consists of two phases, i.e., an aqueous phase and an organic phase. The aqueous phase contains the hydroxylamine of formula VI and the organic solvent phase contains the phenol of the formula II–A above. The electrolysis reaction can be carried out for a period of at least ½ hour or longer. Generally, it is preferred to carry out the electrolysis for a period of from 1 to 10 hours. If desired, electrolysis can be carried out for periods longer than 10 hours. However, since the use of electrolysis times of greater than 10 hours produce no additional beneficial results, these prolonged reaction times need not be employed.

The quinone of formula III–A that is formed in accordance with this invention can be easily recovered in pure form from the two-phase reaction medium since it is present in the organic solvent phase, and the other constituents of the reaction medium are in the aqueous phase. By means of phase separation, the quinone of formula III–A is obtained in the organic phase free of contaminants. The quinone of formula III–A can be easily obtained from the organic phase by evaporation of the organic solvent. Therefore, there is no need to subject the quinone obtained by the process of this invention to purification techniques such as distillation which may cause decomposition and deterioration of the quinone product.

The compound of the formula III–A can be converted to a compound of the formula IV by reduction. Any conventional method of reducing a quinone to a hydroquinone can be utilized in carrying out this reduction. A preferred method of converting the compound of formula III–A to the compound of formula IV is by catalytic hydrogenation. Any conventional method of catalytic hydrogenation can be utilized in carrying out this hydrogenation step. Among the preferred methods of hydrogenation are included hydrogenating in the presence of a palladium or platinum catalyst, preferably palladium or platinum on a carrier material such as carbon or barium sulfate. Generally, this hydrogenation is carried out in a solvent medium such as an inert organic solvent. Any conventional inert organic solvent can be utilized in carrying out this reaction. Among the preferred solvents are alcohols such as ethanol and methanol and ethers such as tetrahydrofuran, dioxane, diethyl ether, etc. Other hydrogenation catalysts which are preferred in accordance with this invention are palladium oxide, palladium chloride, Raney nickel, etc. In carrying out this reaction, temperature is not critical and this reaction can be carried out at room temperature. If desired, higher or lower temperatures can be utilized. Generally, this reaction is carried out at a temperature of from about $0°$ C. to about $100°$ C. depending upon the reflux and freezing temperature of the solvent.

In the case where $R_1'$ in the compound of formula III–A is a protecting group which can be removed by hydrogenolysis and it is desired to produce a compound of formula IV where $R_1'$ is unaffected, care should be maintained to allow only one mole of hydrogen in the reaction medium to be present per mole of the compound of formula III–A. In this manner, only the two oxo groups will be reduced to the hydroxy substituents without affecting $R_1'$ where $R_1'$ is a group removable by hydrogenolysis. Also by affecting the hydrogenation reaction in the presence of a catalyst having one mole of hydrogen gas per mole of the compound of formula III–A absorbed thereon, the two oxo substituents will be reduced to the two hydroxy substituents without affecting the amino protecting group. On the other hand, where the hydrogenation is carried out with an excess of hydrogen gas, i.e., above one mole per mole of the compound of formula III–A, reduction of the two oxo substituents to hydroxy substituents and removal of the amino protecting group will be carried out. Therefore, where it is desired to convert the compound of formula III–A wherein $R_1'$ is a protecting group removable by hydrogenolysis to a compound of the formula IV where $R_1$ is hydrogen, the hydrogenation is carried out utilizing an excess of hydrogen gas.

In the compound of formula IV–A, where $R_1'$ is aralkoxycarbonyl, this group can be removed by either hydrolysis or hydrogenolysis. The hydrogenolysis can be carried out by hydrogenation. Any conventional method of hydrogenation can be utilized. Among the preferred methods is catalytic hydrogenation such as described in connection with the conversion of a compound of formula III–A to a compound of the formula IV–A. In the case of a compound of formula IV–A there is no necessity to utilize two moles of hydrogen per mole of the compound of formula IV–A since one mole of hydrogen will remove aryloxycarbonyl groups from the compound of formula IV. However, if desired, excess hydrogen can be utilized.

On the other hand, where $R_1'$ in the compound of formula IV–A is a group removable by hydrolysis such as formyl, t-butoxycarbonyl, lower alkanoyl, aroyl, etc., these groups can be removed by acid hydrolysis.

In carrying out this acid hydrolysis, any strong mineral acid can be utilized. Among the preferred strong mineral acids are included, sulfuric acid, hydrochloric acid, hydrobromic acid and hydroiodic acid, the preferred acids being hydrobromic acid and hydroiodic acid. When a strong mineral acid is utilized, the hydrolysis reaction is generally carried out in an organic solvent such as acetic acid, dioxane, or acetone. Another means of hydrolyzing these groups is by treatment with a Lewis acid such as boron trifluoride, etc. When a Lewis acid is utilized, this reaction is carried out, preferably, in an ether or halogenated hydrocarbon solvent such as methylene chloride and diethyl ether. In carrying out the hydrolysis reaction, temperatures of from $-78°$ C. to the reflux temperature of the reaction medium can be utilized.

In the case where hydrolysis temperatures of from $-78°$ C. to $30°$ C. are utilized, hydrolysis only removes the amino protecting group of the compound of formula IV–A to produce a compound of the formula

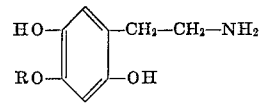

IV–B wherein R is as above.

On the other hand, when hydrolysis is carried out at a temperature above $30°$ C., preferably at reflux utilizing a hydrohalic acid, hydrolysis removes both the lower alkyl and amino protecting group to convert the compound of formula IV–A directly to a compound of formula I. The preferred acid for removing both the alkyl and amino protecting group to convert the compound of formula IV–A directly to a compound of formula I. The preferred acid for removing both the alkyl and amino protecting groups is hydrobromic acid.

The compound of formula I can also be formed from the compound of formula IV–B. This is accomplished by carrying out the acid hydrolysis with hydrohalic acids such as hydrobromic acid at temperatures of about 30° C., preferably at reflux temperatures so as to remove the lower alkyl group from the hydroxy substituent. Therefore, the compound of formula IV–A can be directly converted to the compound of formula I by acid hydrolysis at temperatures of about 30° C., preferably reflux temperatures, or via the intermediate of formula IV–B. In the case where the intermediate is formed, hydrolysis is carried out at a low temperature from −78° C. to 30° C. with an acid such as sulfuric or phosphoric acid, to form the intermediate of formula IV–B.

The intermediate of formula IV–B is then converted to the compound of formula I by acid hydrolysis at a temperature of above 30° C. in the aforementioned manner.

The compound of formula II can be prepared from a compound of the formula

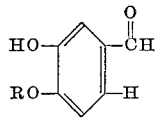

VII where R is as above.

In preparing the compound of formula II, the compound of formula VII is reacted with nitromethane to produce a compound of the formula

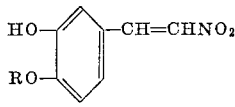

VIII where R is as above.

Generally, the reaction of a compound of formula VII with nitromethane is carried out at room temperature, i.e., from 15° to 35° C., in the absence of light and in an inert organic solvent such as a lower alkanol. However, yields by this procedure have been very low. In accordance with this invention, it has been found that when this reaction is buffered or maintained at a pH of from about 5.8 to 6.0, the compound of formula VIII is obtained in yields of as high as 80%.

Any conventional method of maintaining the pH at a value of from about 5.8 to 6.0 can be utilized in this process. In accordance with a preferred embodiment of this invention, this pH is buffered by adding a lower alkanoic acid salt of an organic amine in a lower alkanol solvent to the reaction medium. Any conventional primary, secondary or tertiary amine can be utilized; among the preferred amines are lower alkylamines such as methylamine, ethylamine, etc., and primary or tertiary amines such as morpholine, piperidine. The preferred salt is methylamine acetate.

The compound of formula VIII can be converted to the compound of formula II by conventional hydrogenation.

The invention will be more fully understood from the specific examples which follow. These examples are intended to illustrate the invention and are not to be construed as limitative thereof.

EXAMPLE 1

3-Hydroxy-4-methoxy-phenylamine

A methanolic buffer solution of methylamine acetate was prepared by adding 2.6 g. (0.0245 mole) of sodium carbonate anhydrous (powder) into a solution of 1.65 g. (0.0245 mole) of methylamine hydrochloride in 25 cc. of methanol. After stirring the suspension for 30 minutes, it was filtered directly into a solution of 2.2 g. (0.0365 mole) of acetic acid in 25 cc. of methanol. The pH of this buffer was between 5.8–6.0. In the meantime 50 g. (0.33 mole) of isovanillin were dissolved in 200 cc. of warm methanol and then cooled to room temperature. 20 g. (0.33 mole) of nitromethane was added and mixed well. The reaction flask (1 liter Erlenmeyer) was then wrapped with aluminum foil. The previously prepared methylamine-acetate buffer solution was added dropwise under mechanical stirring to the isovanillin-nitromethane mixture over a period of 30 minutes. After the addition, the reaction mixture was allowed to stand at room temperature in the *dark* for 88 hours. The yellow crystals formed were filtered, washed with 25 cc. of cold methanol and air dried to give 49 g. (76 percent) of 3-hydroxy-4-methoxy-β-nitrostyrene.

EXAMPLE 2

3-Hydroxy-4-methoxy-phenethylamine 260 g. of 3-hydroxy-4-methoxy-β-nitrostyrene was suspended in ca. 1 liter of water and 260 cc. of aqueous solution containing 76 percent by weight of HCl. The volume was made up to 3.5 liters with water, 50 g. of 10 percent by weight of palladium on 90 percent by weight carbon was added and the heterogeneous mixture was hydrogenated in a glass liner at 800 p.s.i.g. and ca. 80° C. for 6 hours. Most of the $H_2$-uptake was observed in the first hour. After cooling overnight, the catalyst was removed by filtration. There resulted a water clear reaction mixture which was evaporated on the rotary evaporator. The solid residue was scraped loose from the flask and 360 cc. of aqueous containing 20 percent by weight of concentrated ammonia was slowly added under ice-cooling. The white salt gradually dissolved while the free amine was precipitating. Before filtering, the crystalline slurry was stirred in the cold for one hour. It was then washed with ice water and dried *in vacuo* at room temperature to yield 173 g. (78 percent) of 3-hydroxy-4-methoxy-phenethylamine m.p. 144–148° C.

EXAMPLE 3

N-(3-Hydroxy-4-methoxyphenethyl)acetamide 25.05 g. (0.15 mole) of 3-hydroxy-4-methoxy-phenethylamine was heated in 15.3 g. (0.15 mole) of acetic anhydride for 2 hours in an oil bath set at 145° C. (magnetic stirring, $N_2$-atmosphere). The reaction mixture was cooled to room temperature and the acetic acid removed on a rotary evaporator at 50° C. To the brown oily residue was added 10 cc. of ethylacetate. Upon seeding the solution turned into an almost solid mass of crystals. It was then crushed, filtered and washed with 3 portions of 10 cc. of ethylacetate. One obtained, after drying *in vacuo*, 25 g. (80 percent) of N-(3-hydroxy-4-methoxyphenethyl)acetamide as white crystals, m.p. 123° C.

EXAMPLE 4

N-(3-Hydroxy-4-methoxyphenethyl) carbamic acid benzyl ester

In a 500 ml. resin jar, equipped with stirrer, nitrogen inlet tube, pH-electrode, two dropping funnels and an ice bath were placed 200 cc. of distilled water and 11.03 g. (0.066 mole) of 3-hydroxy-4-methoxy-phenethylamine. The pH of this suspension was 9.2. 66 cc. of 1N aqueous NaOH and 9.15 cc. of benzylchloroformate were added simultaneously over a 20 minute period. The maximum pH reached was 11.3 and showed a value of 9.6 after stirring for 1 hour in the ice bath. The reaction mixture was filtered, washed well with water and air dried over the weekend. One obtained 16.64 g. (84 percent) of N-(3-hydroxy-4-methoxyphenethyl)carbamic acid benzyl ester as white crystals m.p. 113° C.

EXAMPLE 5

N-(3-Hydroxy-4-methoxyphenethyl)formamide 50 g. (0.3 mole) of 3-hydroxy-4-methoxy-phenethylamine was refluxed for 21 hours under stirring in 250 cc. of methylformate. The reaction mixture was never a clear solution. Before filtering off and washing the crystals with some methylorthoformate, the batch was cooled to 0° C. and stirred for 2 hours at this temperature. After drying *in vacuo* at room temperature, one obtained 44.5 g. (7.6 percent) of N-(3-hydroxy-4-methoxyphenethyl) formamide as white crystals, m.p. 111–113° C.

EXAMPLE 6

2-(2-Acetamidoethyl)-5-methoxy-p-benzoquinone

In a 250 ml. one neck round bottom flask, equipped with stirrer and ice bath were placed: 12.54 g. (0.06 mole) of N-(3-hydroxy-4-methoxyphenethyl)acetamide, 160 cc. 0.056$M$ aqueous $NaH_2PO_4$ buffer and 40 g. (0.149 mole) of Fremy's salt (sodium nitrosodisulfonate). The heterogeneous reaction mixture was stirred well in an ice bath for 3.5 hours. The reaction mixture was worked up by extracting with a total of 2.1 liters of ethyl acetate. The combined yellow extracts were then dried over $MgSO_4$ and evaporated in vacuo at 40° C. to yield 13.4 g. (100 percent) of 2-(2-acetamidoethyl)-5-methoxy-p-benzoquinone as bright yellow crystals.

EXAMPLE 7

N-[2-(4-Methoxy-3,6-dioxo-1,4-cyclohexadien-1-yl)-ethyl]formamide 4.88 g. (0.025 mole) of the N-(3-hydroxy-4-methoxyphenethyl)formamide was stirred vigorously for 4 hours at 0° C. in a slurry of 20 g. of wet (water washed, ca. 0.075 mole) Fremy's salt (sodium nitrosodisulfonate) in 55 cc. of 1 molar $NaH_2PO_4$ solution. The lemon yellow reaction mixture was filtered (slow filtration) washed with 3 portions of 40 cc. of ice water, and dried overnight in vacuo to give crude product. The organic material was dissolved by refluxing in 250 cc. of ethyl acetate. The hot solution was filtered over a bed of silica and washed with 50 cc. of hot ethyl acetate. The clear filtrate was chilled in refrigerator overnight, the crystals filtered, washed with little cold ethyl acetate and dried in vacuo at room temperature. One obtained N-[2-(4-methoxy-3,6-dioxo-1,4-cyclohexadien-1-yl)-ethyl]formamide melting at 135–138° C.

EXAMPLE 8

N-[2-(4-Methoxy-3,6-dioxo-1,4-cyclohexadien-1-yl)-ethyl]carbamic acid benzyl ester In a 1 liter round bottom flask, equipped with mechanical stirrer, dropping funnel and ice water bath were placed 500 cc. of 0.028$M$ aqueous $NaH_2PO_4$ and 135 g. (0.5 mole) of Fremy's salt (sodium nitrosodisulfonate). While stirring vigorously in an ice bath, 37 g. (0.123 mole) of N-(3-hydroxy-4-methoxyphenethyl)carbamic acid benzyl ester dissolved in 350 cc. of acetone was added within ca. 5 minutes and the suspension was stirred for 68 hours. The heterogenous mixture was diluted with water to a volume of six liters and was subsequently extracted with a total of 2.5 liters of ethyl acetate. The organic phases were combined and washed once with 250 cc. of saturated aqueous sodium bicarbonate solution followed by two portions of 250 ml. of water. The yellow solution was dried over $Na_2SO_4$, filtered and concentrated to a volume of ca. 250 cc. After cooling with ice, the crystals were filtered off and washed with 25 cc. of cold ethyl acetate. The mother liquor was evaporated to 25 cc., chilled, filtered and washed with cold ethyl acetate to yield N-[2-(4-methoxy-3,6-dioxo-1,4-cyclohexadien-1-yl)-ethyl]carbamic acid benzyl ester.

1st crop: 32.6 g., m.p. 130° C.
2nd crop: 3.2 g., m.p. 125° C.
Yield: 35.8 g. (92 percent)

EXAMPLE 9

N-(2,5-Dihydroxy-4-methoxyphenethyl)acetamide 6.19 g. (0.0278 mole) of 2-(2-acetamidoethyl)-5-methoxy-p-benzoquinone was dissolved in 50 cc. of methyl alcohol and hydrogenated over 120 mg. of 10 percent by weight palladium on 90 percent by weight carbon catalyst having hydrogen adsorbed thereon. After filtration and evaporation to dryness one obtained 6.3 g. (100 percent) of N-(2,5-dihydroxy-4-methoxyphenethyl)acetamide as a tan solid material.

EXAMPLE 10

N-(2,5-Dihydroxy-4-methoxyphenethyl)formamide 1.0 g. of N-[2-(4-methoxy-3,6-dioxo-1,4-cyclohexadien-1-yl)-ethyl]formamide was dissolved in 30 cc. of MeOH and reduced with hydrogen over 100 mg. of 10 percent by weight palladium on 90 percent by weight carbon catalyst. The hydrogen uptake ceased after 10 minutes. The reaction mixture was stirred for another 20 minutes before it was filtered under nitrogen over a bed of silica. Evaporation and recrystallization of the solid residue from 3 cc. of methyl alcohol and 10 cc. of ethyl acetate yielded 600 mg. of N-(2,5-dihydroxy-4-methoxyphenethyl)formamide as tan colored crystals.

EXAMPLE 11

N-(2,5-Dihydro-4-methoxyphenethyl)carbamic acid benzyl ester

The catalyst which was 10 percent by weight palladium on 90 percent by weight carbon, under nitrogen atmosphere, was added to a methanolic solution of the N-[2-(4-methoxy-3,6-dioxo-1,4-cyclohexadien-1-yl)-ethyl]carbamic acid benzyl ester. An exothermic reaction occurred bringing the mixture to near reflux temperature. After cooling to room temperature, the catalyst was filtered off. Small needles crystallized from the filtrate within an overnight period. They were collected, washed with methanol and dried in vacuo. This material was N-(2,5-dihydro-4-methoxyphenethyl)carbamic acid benzyl ester.

EXAMPLE 12

2,5-Dihydroxy-4-methoxyphenethylamine acetate 10 g. (0.0318 mole) of the N-[2-(4-methoxy-3,6-dioxo-1,4-cyclohexadien-1-yl)-ethyl]carbamic acid benzyl ester was dissolved in 200 cc. of methanol. 2.5 cc. of (0.0438 mole) acetic acid and 1.5 g. of 10 percent by weight palladium on 90 percent by weight carbon catalyst was added. The hydrogenation was carried out for 3 hours at room temperature, 305–270 p.s.i. $H_2$ in a glass lined rocking autoclave. After removing the catalyst by filtration, the faintly reddish solution was evaporated on the rotary evaporator at 50° C. There resulted a light brown oily residue which was dissolved in 300 cc. of isopropanol. The product was crystallized for two hours at 0° C. After filtering, washing with cold isopropanol followed by diethyl ether and drying in vacuo one obtained 5.2 g. (68 percent) of 2,5-dihydroxy-4-methoxyphenethylamine acetate as off-white crystals m.p. 183–185° C. Another 0.8 g. of tan-greenish crystals, m.p. 170° C., was obtained from the mother liquors.

EXAMPLE 13

6-Hydroxydopamine from N-(2,5-Dihydroxy-4-methoxyphenethyl)acetamide

In a 100 cc. flask, equipped with a stirrer and a nitrogen inlet tube were placed 5.04 g. (0.0224 mole) of N-(2,5-dihydroxy-4-methoxyphenethyl)acetamide and 10 cc. of an aqueous solution containing 48 percent by weight of hydrogen bromide. After refluxing for 4 hours under nitrogen atmosphere the brown reaction mixture was evaporated on the rotary evaporator. The brown crystals were slurried in isopropanol, filtered and washed with the same solvent. One obtained 6-hydroxydopamine.

EXAMPLE 14

6-Hydroxydopamine from N-(2,5-Dihydroxy-4-methoxyphenethylamine acetate 11.5 g. (0.0473 mole) of 2,5-dihydroxy-4-methoxyphenethylamine acetate was refluxed for 5 hours in 62.5 cc. of an aqueous solution containing 48 percent by weight hydrogen bromide under a nitrogen atmosphere. The light brown reaction mixture was seeded, cooled to 0° C., filtered and washed with 3 portions each 20 cc. of isopropanol followed by 3 portions each 20 cc. of hexane. After drying in vacuo one obtained 11.31 g. (95 percent) of 6-hydroxydopamine as white crystals m.p. 211–212° C.

EXAMPLE 15

6-Hydroxydopamine from N-(2,5-dihydroxy-4-methoxyphenethyl)carbamic acid benzyl ester By the procedure of Example 14 N-(2-,5-dihydroxy-4-methoxyphenethyl)carbamic acid benzyl ester is converted to 6-hydroxydopamine.

EXAMPLE 16

6-Hydroxydopamine from N-(2,5-dihydroxy-4-methoxyphenethyl)formamide

By procedure of Example 14 utilizing 50 equivalents of a 10 N hydrogen bromide in dioxane per 1 equivalent N-(2,5-dihydroxy - 4 - methoxyphenethyl)formamide; the formamide is converted to 6-hydroxydopamine.

EXAMPLE 17

| Tablet Formulation: | Per Tablet, mg. |
|---|---|
| N - (2-(4-methoxy-3,6-dioxo-1,4-cyclohexadien-1-yl)-ethyl)formamide | 100 |
| Lactose, U.S.P. | 202 |
| Corn Starch | 80 |
| Prehydrolyzed corn starch | 20 |
| Calcium Stearate | 8 |
| Total Weight | 410 |

Procedure

1. N-(2-(4-methoxy-3,6-dioxo-1,4-cyclohexadien-1-yl)-ethyl)formamide, lactose, corn starch, and prehydrolyzed corn starch were blended in a suitable mixer.
2. The mixture was granulated to a heavy paste with water and the moist mass was passed through a #12 screen. It was then dried overnight at 110° F.
3. The dried granules were passed through a #16 screen and transferred to a suitable mixer. The calcium stearate was added and mixed until uniform.
4. The mixture was compressed at a tablet weight of 410 mg. using tablet punches having a diameter of approximately ⅜″. (Tablets may be either flat or biconvex and may be scored if desired.)

EXAMPLE 18

A tablet was prepared by the procedure of Example 17 utilizing N - (2,5 - dihydroxy-4-methoxyphenethyl)acetamide as the active ingredient.

EXAMPLE 19

A tablet was prepared by the procedure of Example 17 utilizing N - (2-(4-methoxy-3,6-dioxo-1,4-cyclohexadien-1-yl)ethyl)-carbamic acid benzyl ester as the active ingredient.

EXAMPLE 20

| Capsule Formation: | Per capsule, mg. |
|---|---|
| N-(2-(4-methoxy-3,6 - dioxo-1,4-cyclohexadien-1-yl)-ethyl)formamide | 10 |
| Lactose, U.S.P. | 165 |
| Corn starch, U.S.P. | 30 |
| Talc, U.S.P. | 5 |
| Total weight | 210 |

Procedure

1. N-(2-(4-methoxy-3,6-dioxo-1,4-cyclohexadien-1-yl)-ethyl)formamide, lactose and corn starch were mixed in a suitable mixer.
2. The mixture was further blended by passing through a Fitzpatrick Comminuting Machine with a #1A screen with knives forward.
3. The blended powder was returned to the mixer, the talc added and blended thoroughly.
4. The mixture was filled into #4 hard shell gelatin capsules on a Parke Davis capsulating machine. (Any similar type capsulating machine may be used.)

EXAMPLE 21

A capsule was prepared by the procedure of Example 20 utilizing N-(2,5-dihydroxy-4-methoxyphenethyl)acetamide as the active ingredient.

EXAMPLE 22

A capsule was prepared by the procedure of Example 20 utilizing N-(2-(4-methoxy-3,6-dioxo-1,4-cyclohexadien-1-yl)ethyl)-carbamic acid benzyl ester as the active ingredient.

EXAMPLE 23

| Suppository Formulation: | Per 1.3 gm. Suppository, gm. |
|---|---|
| N-(2-(4-methoxy-3,6 - dioxo-1,4 - cyclohexadien-1-yl)-ethyl)formamide | 0.025 |
| Refined synthetic cocoa butter | 1.230 |
| Carnauba wax | 0.045 |

Procedure

1. The refined synthetic cocoa butter and the carnauba wax were melted in a suitable size glass lined container (stainless steel may also be used), mixed well and cooled to 45° C.
2. N-(2-(4-methoxy-3,6-dioxo-1,4-cyclohexadien-1-yl)-ethyl)formamide which had been reduced to a fine powder with no lumps was added and stirred until completely and uniformly dispersed.
3. The mixture was poured into suppository molds to yield suppositories having an individual weight of 1.3 gms.
4. The suppositories were cooled and removed from molds. They were individually wrapped in wax paper for packaging. (Foil may also be used.)

I claim:
1. A compound of the formula

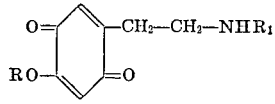

wherein R is lower alkyl, and $R_1$ is an amino protecting group removable by hydrogenolysis or hydrolysis selected from the group consisting of formyl, $C_2$–$C_6$- lower alkanoyl, $C_{1-6}$-alkoxy carbonyl, mono-nuclear aryl-$C_1$–$C_6$ alkoxy carbonyl and mono-nuclear aryl wherein the mono-nuclear aromatic moiety is phenyl or phenyl substituted with hydroxy, methylenedioxy, halogen, nitro, lower alkyl or lower alkoxy.
and pharmaceutically acceptable salts thereof.
2. The compound of claim 1 wherein said compound is 2-(2-acetamidoethyl)-5-methoxy-p-benzoquinone.
3. The compound of claim 1 wherein said compound is N-[2-(4-methoxy-3,6 - dioxo-1,4 - cyclohexadien-1-yl)-ethyl]formamide.
4. The compound of claim 1 wherein said compound is N-[2-(4-methoxy-3,6 - dioxo-1,4-cyclohexadien-1-yl)-ethyl]carbamic acid benzyl ester.

References Cited

Senoh et al.: J.A.C.S.. vol. 81, pp. 6222–30, 1959.

VIVIAN GARNER, Primary Examiner

U.S. Cl. X.R.

204—78; 260—338, 471 C, 501.17, 558 R, 562 A, 570.8 R, 613 D; 424—300, 320, 324